United States Patent [19]

Christner et al.

[11] 4,417,872

[45] Nov. 29, 1983

[54] HEAT TREATING

[75] Inventors: Larry G. Christner, Sandy Hook; Dana A. Kelley, New Milford, both of Conn.

[73] Assignee: Energy Research Corporation, Danbury, Conn.

[21] Appl. No.: 344,489

[22] Filed: Feb. 1, 1982

[51] Int. Cl.³ .......................... F26B 9/12; C10B 51/00
[52] U.S. Cl. ....................................... 432/18; 201/25; 201/44
[58] Field of Search ...................... 432/18, 24; 201/44, 201/25

[56] References Cited

U.S. PATENT DOCUMENTS

| 3,914,392 | 10/1975 | Klett | 201/25 |
| 4,030,876 | 6/1977 | Akae et al. | 432/18 |
| 4,287,025 | 9/1981 | Lersmacher | 201/25 |

FOREIGN PATENT DOCUMENTS

| 860342 | 2/1961 | United Kingdom . |
| 889351 | 2/1962 | United Kingdom . |
| 921236 | 3/1963 | United Kingdom . |
| 956452 | 4/1964 | United Kingdom . |
| 1024974 | 4/1966 | United Kingdom . |
| 1031126 | 5/1966 | United Kingdom . |
| 1033277 | 6/1966 | United Kingdom . |
| 1228910 | 4/1971 | United Kingdom . |

OTHER PUBLICATIONS

G. M. Jenkins, Polymeric Carbons-Carbon fibre, glass and char, (1976), pp. 36-44.

*Primary Examiner*—John J. Camby

[57] ABSTRACT

Heat treating of a material containing a carbon degradable content is carried out by segmenting the temperature range of heat treating into at least two intervals, a first one of which is able to support heat treating without blistering of the material at a first maximum rate and a second one of which is able to support heat treating without blistering at a second maximum rate different from the first rate, and the material is heated at a first rate equal to or less than the first maximum rate in the first interval and at a second rate different from the first rate and equal to or less than the second maximum rate in the second interval.

15 Claims, 2 Drawing Figures

HEAT TREATING

BACKGROUND OF THE INVENTION

This invention relates to the treatment of materials and, in particular, to the heat treating of materials having a carbon degradable content in order to convert the carbon degradable content to carbon.

In processes of the above type, it is often desirable that the end effect of the process is carbonization of the carbon degradable content without appreciable disturbance of certain of the other properties of the material. This is especially true in the heat treating of plates to be used to form various gas passages in fuel cells. In particular, in the heat treating of these plates, it is necessary that the surface integrity as well as the negligible through porosity of the plates be maintained. Degradation in surface integrity is evidenced by surface blistering, while increases in through porosity are evidenced by gas leakage, both of which effects could result in a decrease in performance and possible damage to the fuel cell incorporating the plates.

In one prior practice for heat treating fuel cell plates, the plates are subjected to heat which is increased at a uniform rate to the temperature at which the carbon degradable content of the plates is converted to carbon. To prevent blistering and/or an increase in through porosity beyond predetermined limits, the rate of increase in temperature is maintained quite low (i.e. at about 5° C./hr.). This, in turn, requires that the processing time be quite long (i.e., about 180 hrs.). Long processing times, however, make the process inefficient and undesirable from a production cost standpoint.

It is therefore an object of the present invention to provide a heat treating practice for materials containing a carbon degradable content which does not suffer from the disadvantages of prior practices.

It is a further object of the present invention to provide a heat treating practice which is considerably more rapid than prior practices.

It is also an object of the present invention to provide a heat treating practice for fuel cell plates which can be carried out rapidly without causing surface blistering and/or appreciable increases in through porosity.

SUMMARY OF THE INVENTION

In accordance with the principles of the present invention, the above and other objectives are realized in a practice wherein the temperature range for heat treating is segmented into at least two intervals, a first one of which being able to support heat treating without blistering of the material being treated at a first maximum rate and a second one of which being able to support heat treating without blistering at a second maximum rate different from the first maximum rate, and wherein the material being treated is heated at a first rate equal to or less than the first maximum rate in the first interval and at a second rate different from the first rate and equal to or less than the second maximum rate in the second interval.

With this practice, the temperature range for heating is thus divided into intervals and heating during each interval is based on the maximum heating rate supportable within that interval without the occurrence of blistering. As a result, heating in intervals having high maximum rates can be relatively rapid, thereby enabling an overall reduction in total heating time as compared to the prior practice of using a single rate over the entire range.

In accordance with a further aspect of the present invention, the temperature intervals and heating rates within the intervals are such as to account for temperature gradients present in the heating apparatus.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
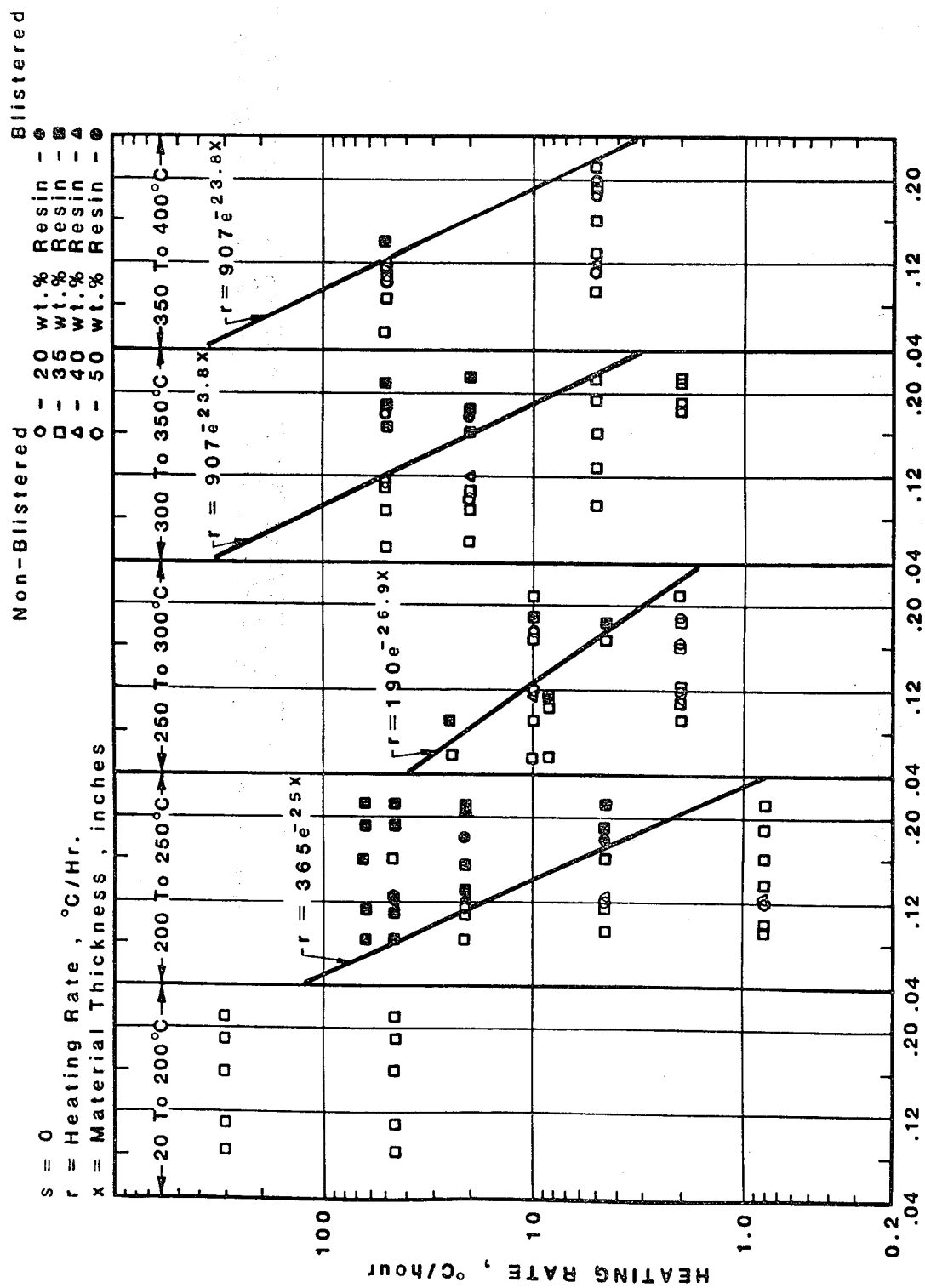
FIGS. 1 and 2 indicate graphically for various heating rates and heating intervals the surface condition of materials of different thickness and carbon degradable content.

As above-indicated, the practice of the present invention contemplates heating of the material or materials to be treated in different intervals at rates related to the maximum heating rates determined for these intervals. In order to practice the present invention, it is thus first necessary to segment the defined heating range into intervals and to determine the maximum heating rates for the intervals. Once these parameters are determined, the rates of heating in a particular interval for a material can be determined to thereby practice the invention.

The establishment of a heating range will depend upon the particular makeup of the carbon degradable content of the materials to be treated. The range should extend to a temperature which is sufficient to ensure substantial conversion of the carbon degradable content to carbon. Preferably, the upper temperature of the range is at a lower temperature for which such carbonization can be realized so as to avoid unnecessary heating and heating time.

Once the limits of the heating range are determined, the range is then divided into a plurality of heating intervals. The initial selection of the number of intervals can be arbitrary and for the sake of simplicity the intervals can be initially made of equal extent.

Having selected the heating intervals, the maximum heating rates can then be determined. In particular, these rates can be established for a material of given thickness and given carbon degradable content ratio for each interval. To accomplish this a sample of the material is heated at a first rate in the first defined interval and then examined to determine whether blistering has occurred. If no blistering has occurred then a new sample of the material is heated at a second rate and examined. This process of heating at different rates is continued until the rate is reached at which blistering first occurs, this rate then being established as the maximum rate for the material of given thickness and given carbon degradable content in the first interval.

The above procedure is then repeated for the subsequent intervals and maximum heating rates established for these intervals.

Once the maximum heating rates for each interval are determined, materials to be treated having the given thickness and carbon degradable content can be heated in each interval at the maximum rate or less without blistering occurring. Heating at such rates will also ensure that there will be no appreciable increase in the through porosity of the material as a result of the heating. Preferably, for a fast overall heating time, each selected rate should be close to the maximum rate for a particular interval.

If the materials to be heated vary in thickness and/or carbon degradable content, then the above procedure should be carried out for each thickness and content combination to assess the maximum heating rates therefor. Heating for a particular material should then be at or below the heating rates associated with the particular thickness and carbon degradable content. In this regard, using the rates established for different combinations, an equation approximating the particular maximum heating rates for the different combinations can be determined for each interval and this equation used to approximate the maximum rate for other combinations.

Figure 2:
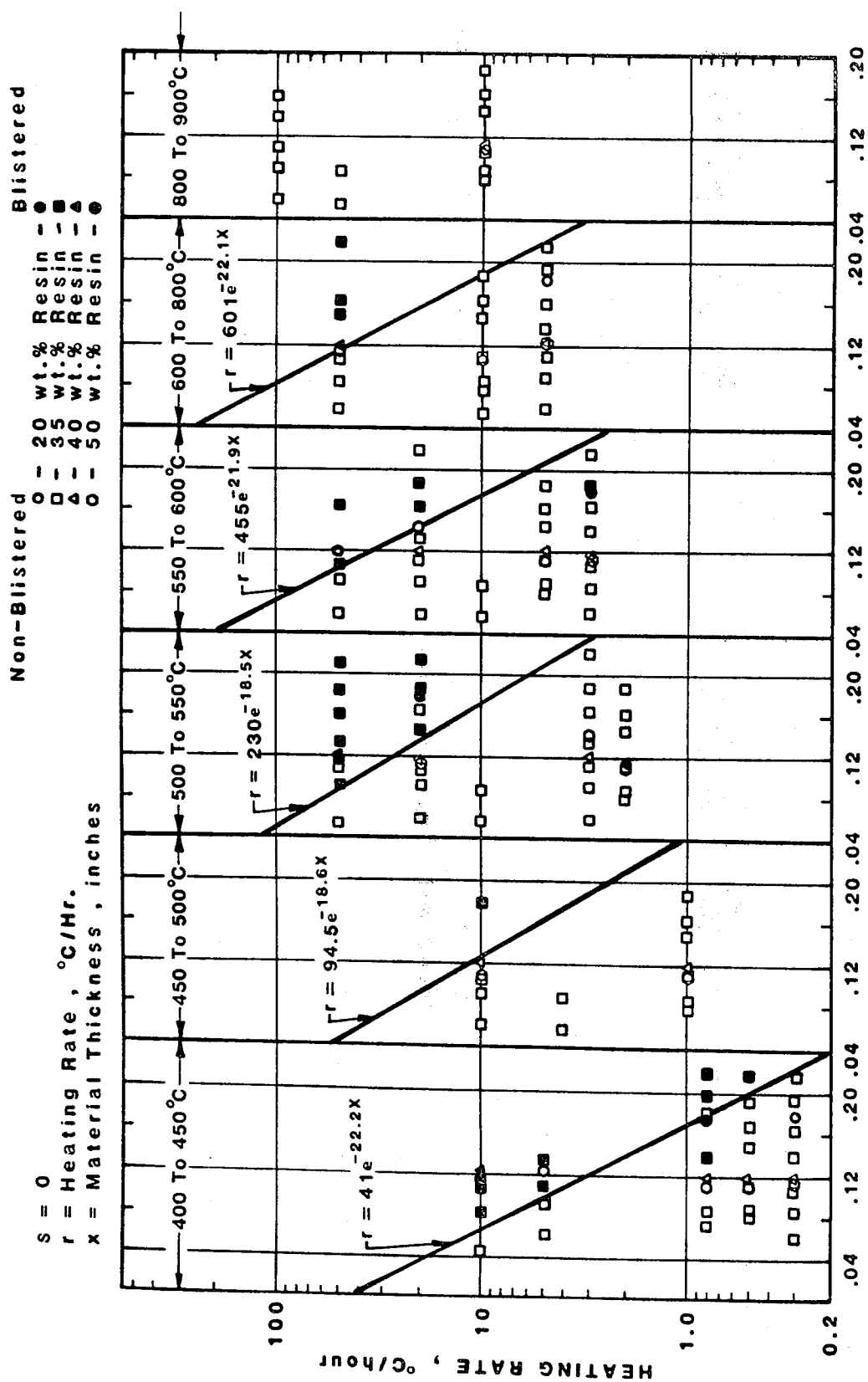

The plots of FIGS. 1 and 2 illustrate the results of the above procedure adapted to plates to be used for making fuel cells. The particular plates contained various ratios of Varcum 29-703 resin and Asbury A-99 graphite and were of various thicknesses. In the graphs, different indicia indicate points related to different carbon degradable contents and indicia which have been blackened represent points at which blistering occurred and indicia which are clear points at which blistering did not occur.

As can be observed from these graphical representations, for the materials being tested, the maximum rates for each interval were substantially independent of changes in the ratio of carbon degradable content to total material content. However, the maximum rates did vary for variation in material thickness and equations are presented in the graphs approximating from the measured points the maximum heating rate r in each interval as a function the material thickness t.

The graphical representations also demonstrate that certain temperature ranges are much more critical as regards heating rate than other ranges. Thus, the heating rate for the 20° to 200° C. range was not critical, while the rate for the 400° to 450° C. range was highly critical.

Table I shows estimated heating programs or cycles determined using the data of FIGS. 1 and 2 for plates of various thickness. In particular, heating cycles for plates ofd 0.060 inches, 0.100 inches, 0.140 inches, 0.160 inches, 0.200 inches and 0.240 inches are set forth.

The cycles in Table I are based upon the use of the maximum heating rates in each temperature interval and result in total heating times which, as can be readily shown, are significantly less than the timers which would have resulted from cycles using a uniform heating rate throughout. Thus, for example, for the cycle associated with the 0.060 inch thick material, if a uniform rate were used throughout the temperature range, this rate would have had to be set at the lowest maximum rate of all the intervals, if blistering were to be avoided. Hence, the rate would have had to be set at 11° C./hr. Use of such a rate, in turn, would have resulted in a total heating time of approximately 80 hours, as compared to the drastically reduced amount of time, i.e., 12.5 hr., required by the present practice. The cycles for the other thicknesses illustrate a similar relative savings in time, even at the large thickness values (e.g., at the 0.240 thickness, the total time for uniform heating would have been 4400 hr. as compared with the 669 hr. of the present practice).

It should be noted that in actual practice the rates used for material thicknesses in the Table I might be made somewhat lower than the maximum rates for safety purposes. This can be accomplished by adding a thickness safety factor s to each actual thickness value to to obtain the value x used in the rate equations.

It should also be noted that the cycles of Table I assume a heating apparatus capable of providing the same heating rate to all parts of the material at any given time. In practical application, however, the heating apparatus employed might well depart from the ideal and exhibit a temperature gradient which would then be imparted to the material. In such case, the heating rates employed for an interval, while always below the maximum rate for that interval, might also have to be below the maximum rate of a subsequentor preceeding interval or intervals. In particular, the rate at any particular time in an interval would have to be equal to or below the lowest of the maximum rates associated with that interval and the other intervals spanned by the temperatures across the material. Thus, for example, if the heating cycle is at the beginning of the temperature interval 350° to 400° C., but the heating apparatus has caused a temperature gradient of 75° C., then the material will have points which span temperatures between 275° C. and 350° C. These temperatures will then encompass the intervals 250° C. to 300° C., 300° C. to 350° C. and 350° C. to 400° C. and the rate at the beginning of the latter interval will thus have to be below the lowest of the maximum rates for the three intervals. As

TABLE I

| HEATING CYCLES FOR MAXIMUM HEATING RATES | | | | | | | |
|---|---|---|---|---|---|---|---|
| x = t + S, where t = material thickness (inches) & S = Safety Factor (inches) | | | | | | | |
| Mat'l Temp. °C. | HEATING RATE EQUATIONS | HEATING RATE °C./Hr S = 0 | | | | | |
| | Thickness, in. | .060 | .100 | .140 | .160 | .200 | .240 |
| 20 to 200 | r > 300° C./Hr | 300 | 300 | 300 | 300 | 300 | 300 |
| 200 to 250 | r = 365e$^{-25x}$ | 81 | 30 | 11 | 6.7 | 2.4 | 0.90 |
| 250 to 300 | r = 190e$^{-26.9x}$ | 38 | 12.9 | 4.4 | 2.6 | .88 | 0.30 |
| 300 to 350 | r = 907e$^{-23.8x}$ | 217 | 84 | 32 | 20 | 7.8 | 3 |
| 350 to 400 | r = 907e$^{-23.8x}$ | 217 | 84 | 32 | 20 | 7.8 | 3 |
| 400 to 450 | r = 41e$^{-22.2x}$ | 11 | 4.5 | 1.8 | 1.2 | .49 | 0.20 |
| 450 to 500 | r = 94.5e$^{-18.6x}$ | 31 | 14.7 | 7.0 | 4.8 | 2.3 | 1.1 |
| 500 to 550 | r = 230e$^{-18.5x}$ | 75 | 36 | 17 | 12 | 5.7 | 2.7 |
| 550 to 600 | r = 455e$^{-21.9x}$ | 123 | 51 | 21 | 14 | 5.8 | 2.4 |
| 600 to 800 | r = 605e$^{-22.1x}$ | 160 | 66 | 27 | 18 | 7.3 | 3.0 |
| 800 to 900 | If x < .140 r ≧ 100 If .140 ≦ x ≦ .240:r ≧ 10 | 100 | 100 | 100 | 10 | 10 | 10 |
| Total time to 900° C. Hrs | | 12.5 | 28.2 | 68.3 | 113.2 | 269 | 669 |
| Days | | .52 | 1.2 | 2.8 | 4.7 | 11.2 | 27.9 | heating continues, the lowest temperature will be brought out of the 250° C. to 300° C. interval so at this point the heating rate can be reset at the lowest of the maximum rates for the remaining two intervals. Hence, the actual heating rate during a given interval might change, as the intervals spanned by the temperature across the material change.

In all cases, it is understood that the above-described practices are merely illustrative of the many possible specific embodiments which represent applications of the present invention. Numerous and varied other arrangements can readily be devised in accordance with the principles of the present invention without departing from the spirit and scope of the invention.

What we claim is:

1. A method of heat treating a material having carbon degradable content in order to convert said carbon degradable content to carbon comprising the steps of:
   defining a temperature range;
   segmenting the temperature range into at least two intervals including establishing at least a first interval capable of supporting a first maximum heating rate for said material without blistering and a second interval capable of supporting a second maximum heating rate for said material without blistering, said first maximum heating rate being different from said second maximum heating rate;
   heating said material over an interval corresponding to said first interval at a first rate equal to or below said first maximum rate;
   and heating said material over a further interval corresponding to said second interval at a second rate different from said first rate and equal to or below said second maximum rate.

2. A method in accordance with claim 1 wherein:
   said second maximum rate exceeds said first maximum rate;
   and said second rate exceeds said first rate.

3. A method in accordance with claim 2 wherein:
   said first rate is substantially equal to said first maximum rate;
   and said second rate is substantially equal to said second maximum rate.

4. A method in accordance with claim 1 wherein:
   said first and second maximum rates are dependent upon the thickness of said material.

5. A method in accordance with claim 4 wherein: said first and second maximum rates correspond to rates associated with a given range of carbon degradable content of said material.

6. A method in accordance with claim 4 wherein: said carbon degradable content comprises a resin.

7. A method in accordance with claim 6 wherein: said resin is Varcum 29-703 resin.

8. A method in accordance with claim 7 wherein: said material further comprises graphite.

9. A method in accordance with claim 8 wherein: said graphite is Asbury A-99 graphite.

10. A method in accordance with claim 9 wherein: said material comprises resin in the weight percent range of 20 to 50 weight percent and graphite in the weight range of 80 to 50 weight percent.

11. A method in accordance with claim 9 wherein: said material comprises approximately 35 weight percent resin and approximately 65 weight percent graphite.

12. A method in accordance with claims 6, 7, 8, 9, 10 or 11 wherein:
    said material has a thickness in a range from about 0.040 inches to about 0.240 inches;
    and said temperature range extends from about 20° C. to about 900° C.

13. A method in accordance with claim 12 wherein:
    said temperature range is segmented into eleven intervals, the first interval being from about 20° C. to about 200° C. and subsequent intervals being increased by about 50° C. increments;
    and the maximum heating rates in said first through eleventh intervals are given, respectively, approximately by the following: equal to or greater than 300° C./Hr, $365e^{-25x°}$ C./Hr, $190e^{-26.9x°}$ C./ Hr; $907e^{-23.8x°}$ C./Hr; $907e^{-23.8x°}$ C./Hr; $41e^{-22.2x°}$ C./Hr; $94.5e^{-18.6x°}$ C./Hr; $230e^{-18.5x°}$ C. /Hr; $455e^{-21.9x°}$ C./Hr; $605e^{-22.1x°}$ C./Hr; and equal to or greater than 100° C./Hr for $x \leq 0.140$ and equal to or greater than 10° C./Hr for $0.140 \leq x \leq 0.240$; where x is equal to the material thickness plus a safety factor which is equal to or greater than zero.

14. A method in accordance with claim 1 wherein:
    said heating during each of said first and second intervals is non-uniform over said material;
    and said first and second rates are adjusted to compensate for said non-uniform heating.

15. A method in accordance with claim 14 wherein: the heating rate in any interval at any given time is equal to or less than the lowest maximum heating rate of the intervals spanned by the highest and lowest temperatures of the material at that time.

* * * * *